United States Patent [19]

Heubner et al.

[11] Patent Number: 4,836,092
[45] Date of Patent: Jun. 6, 1989

[54] PNEUMATIC-HYDRAULIC PRESSURE TRANSDUCER

[75] Inventors: Wilhelm Heubner, Itzgrund; Wolfgang Reeb, Baunach, both of Fed. Rep. of Germany

[73] Assignee: FAG Kugelfischer Georg Schafer (KGaA), Fed. Rep. of Germany

[21] Appl. No.: 160,168

[22] Filed: Feb. 25, 1988

[30] Foreign Application Priority Data

Mar. 14, 1987 [DE] Fed. Rep. of Germany ....... 8703884

[51] Int. Cl.[4] ............................................. F01B 19/00
[52] U.S. Cl. ........................................ 92/48; 92/110; 91/520; 303/113
[58] Field of Search .................. 92/63, 64, 48, 49, 110, 92/111, 112; 91/520, 521, 522, 523, 524; 303/110, 111, 113; 180/84.2, 197, 244

[56] References Cited

U.S. PATENT DOCUMENTS

| | | | |
|---|---|---|---|
| 2,983,256 | 5/1961 | Seeloff | 92/110 |
| 2,992,652 | 7/1961 | Fellberg | 303/84.2 |
| 3,148,364 | 9/1964 | Engles et al. | 303/84.2 |
| 3,430,539 | 3/1969 | Freeman | 92/111 |
| 3,457,840 | 7/1969 | Grimes | 92/111 |
| 3,482,485 | 12/1969 | Abbott | 92/48 |
| 3,975,989 | 8/1976 | Hirmann | 92/48 |
| 4,515,412 | 5/1985 | Sato | 303/111 |
| 4,575,161 | 3/1986 | Vanzant et al. | 303/110 |
| 4,641,895 | 2/1987 | Belart et al. | 180/242 |

FOREIGN PATENT DOCUMENTS

| | | | |
|---|---|---|---|
| 2636518 | 2/1978 | Fed. Rep. of Germany | 92/48 |
| 0191434 | 8/1986 | Japan | 180/197 |
| 300808 | 11/1928 | United Kingdom | 92/111 |
| 2024946 | 1/1980 | United Kingdom | 92/111 |

*Primary Examiner*—Edward K. Look
*Assistant Examiner*—Thomas Denion
*Attorney, Agent, or Firm*—Ostrolenk, Faber, Gerb & Soffen

[57] ABSTRACT

A combined pneumatic and hydraulic pressure transducer is comprised of a pressure capsule with an open interior divided into first and second sections by a partition wall, and a respective axially displaceable diaphragm extends across each of the sections defining third and fourth pressure chambers which change in volume due to axial displacement of the respective diaphragms. A rigid piston intermediate member extends through the partition wall and joins the diaphragms to move together. Connections communicating between the third pressure chambers and between the fourth pressure chambers pass through the intermediate member. A respective hydraulic cylinder at each end of the pressure capsule receives and operates upon a respective end of the intermediate member.

10 Claims, 1 Drawing Sheet

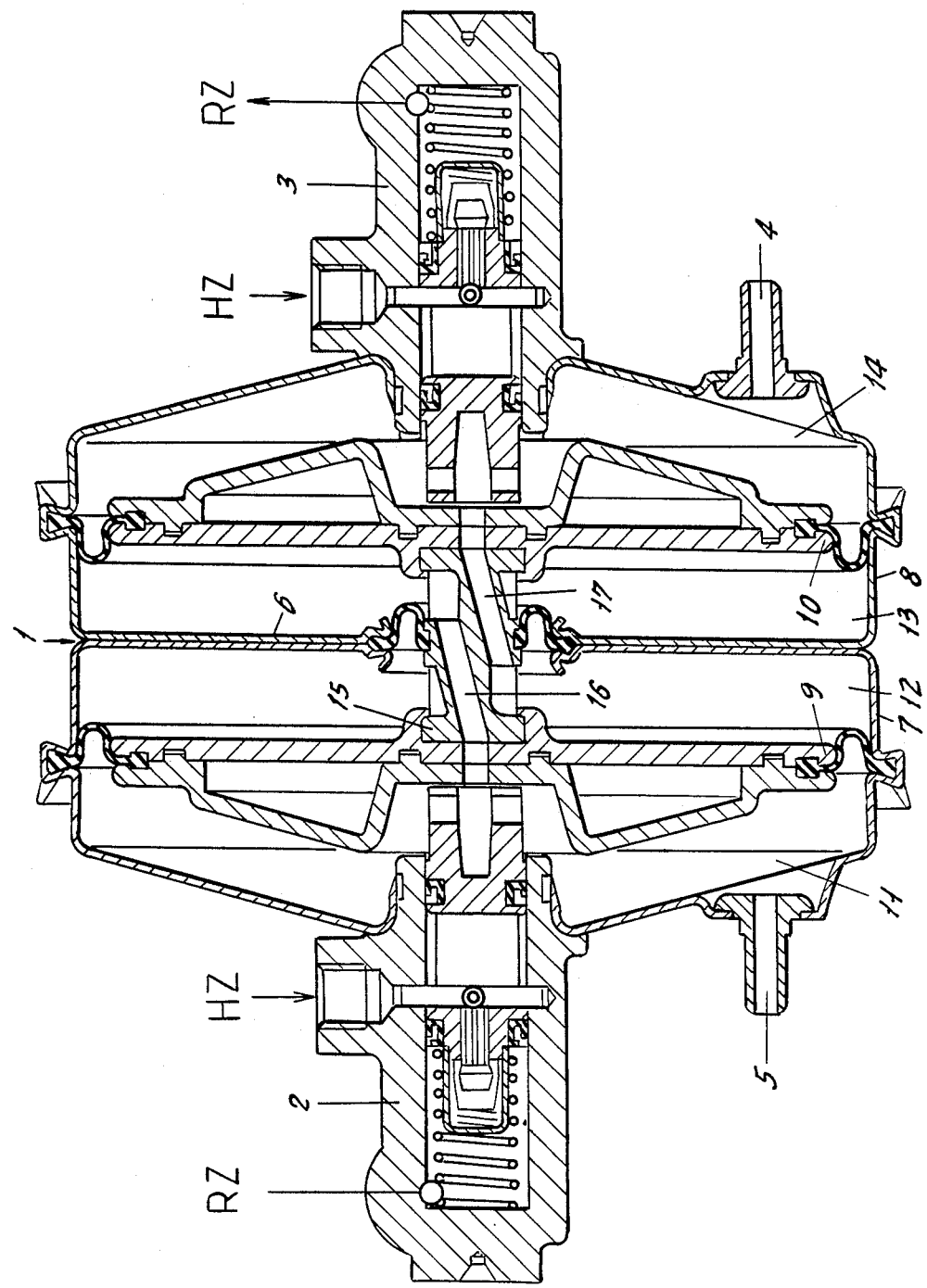

PNEUMATIC-HYDRAULIC PRESSURE TRANSDUCER

BACKGROUND OF THE INVENTION

The present invention relates to a combined pneumatic and hydraulic pressure transducer, particularly a double acting pressure capsule having two cooperating pressure cylinders.

Such pressure transducers are known from Publication No. HB 43 603 DA of FAG Kugelfischer KgaA, the assignee hereof. Such transducers are used in so-called start-off assistance systems for automotive vehicles. Those systems prevent the spinning of the more poorly adhering drive wheel, for instance, on ice and snow. The pneumatic-hydraulic pressure transducer comprises a double-acting vacuum capsule with hydraulic cylinders flanged onto it. A vacuum pump produces a vacuum in one of the two chambers of the capsule and pressure in the other chamber. This shifts the diaphragm piston and acts on the hydraulic piston of the flanged-on hydraulic cylinder, which leads to a pressure buildup in the corresponding brake circuit. As a result, the faster turning wheel is braked.

In practice, it has been found that the pressure which can be produced with known pressure transducers is in many cases insufficient. A pressure transducer of large dimensions, which includes a diaphragm piston of larger diameter, requires more space, and space is very limited in modern passenger cars.

SUMMARY OF THE INVENTION AND DESCRIPTION OF THE DRAWING

The object of the present invention is to improve a double acting pneumatic-hydraulic pressure transducer of the aforementioned type so that a higher system pressure is obtained with simple means and without large changes in construction or without using a large amount of space.

According to the invention, a combined pneumatic and hydraulic pressure transducer is provided. It includes a pressure capsule with an open interior. A partition wall in the capsule extends across the axis of the capsule and divides the capsule into first and second sections along the axis of the capsule. A respective axially displaceable diaphragm extends across each of those sections and divides each of those sections into respective third and foruth pressure chambers. One of the third and fourth pressure chambers enlarges, while the other becomes smaller due to axial displacement of the diaphragms. There is an axially displaceable intermediate member that joins the first and second diaphragms so that they shift axially together. First means pressure connect the third pressure chambers while second means pressure connect the fourth pressure chambers. There are first and second hydraulic cylinders respectively connected to one of the third and one of the fourth pressure chambers.

The intermediate member extends through the partition wall and is sealed off there. Both the first and the second pressure connecting means are defined in and pass through and along the intermediate member.

The first and second sections of the capsule are generally mirror images of each other, except that the third pressure chamber of one section is on the side away from the partition wall and the third pressure chamber of the other section is on the side toward and partition wall, and the same applies to the fourth pressure chamber of each of the sections.

The first and second hydraulic cylinders are respectively placed to receive in them a respective opposite end of the intermediate member. The intermediate member is preferably a rigid piston to which the diaphragms are secured.

Other objects and features of the invention are explained with reference to the drawing FIG. 1 showing a cross-section of an illustrative embodiment.

DESCRIPTION OF A PREFERRED EMBODIMENT

FIG. 1 shows a double acting pressure transducer according to the invention in cross-section. The pressure capsule 1 is comprised of two housing halves 7, 8 which are symmetric and mirror images of each other and are separated by a partition wall 6 between them. At both sides, the respective hydraulic cylinders 2 and 3 are flanged on the pressure capsule. Vacuum or pressure to the respective housing halves 7, 8 is applied by known means, not shown, via the connections 4 and 5, respectively to one or the other connection 4 or 5.

Each housing half 7 and 8 is divided by an axially displaceable diaphragm piston 9 and 10, respectively, into a left-hand pressure chamber 11 and 13, and a right-hand pressure chamber 12 and 14. Both of the diaphragm pistons 9 and 10 are arranged on a common intermediate member 15 so that those diaphragm pistons move together. The intermediate member has boreholes 16 and 17 passing through and along it. The borehole 16 connects the left-hand pressure chambers 11, 13 and the borehole 16 connects the right-hand pressure chambers 12, 14, with each other.

The pressure transducer operates in the following way. In a vehicle (not shown), for example, when the electronic system (not shown) notes that, for instance, the right drive wheel is spinning, the pump (not shown) which is driven by an electric motor (not shown) is acted on by pressure via lines of the connection 5 or by vacuum via lines of the connection 4. As a result, pressure is built up in the pressure chamber 11. Because of the connecting borehole 16, pressure also is built up in the pressure chamber 13. Concurrently, a vacuum is produced in the pressure chamber 12, and because of the connecting borehole 17, a vacuum is concurrently built up in the pressure chamber 14. In this way, an axial force, directed to the right, acts on the diaphragm pistons 9 and 10. The amount of force developed results from the pressure difference and the effective areas of the two pistons surfaces. The diaphragms move toward the right. The intermediate members move with them. As a result, the hydraulic piston of the right-hand hydraulic cylinder 3 is also moved. Pressure is built up in the right-hand brake circuit, and this pressure brakes the right drive wheel.

In this connection, it is assured that the driver can also brake a spinning wheel normally at any time, even during the control cycle. Another advantage of the invention is that due to the combining of a pneumatic system with a hydraulic system, no extreme pressure gardients occur, so that the control processes take place smoothly.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A pneumtic and hydraulic pressure transducer, adapted to exert a force in either of two opposite directions, the transducer comprising:

a pressure capsule with an open interior;

a partition wall in the capsule across the axis of the capsule dividing the open interior of the capsule into first and second sections along the axis of the capsule;

a respective first and second axially displaceable diaphragm extending across the first and second sections and across the capsule axis for respectively dividing each of the first and second sections into third and fourth pressure chambers, such that one of the third and fourth pressure chambers enlarges when the other of the third and fourth pressure chambers becomes smaller due to axial displacement of the respective diaphragms in the respective sections;

an axially displaceable intermediate member joining the first and the second diaphragms for shifting axially together in each axial direction;

first means pressure connecting the third pressure chambers of the first and second chambers of the first and second sections;

second means pressure connecting the fourth pressure chambers of the first and second sections;

a first hydraulic cylinder connected to one of the third pressure chambers; and a second hydraulic cylinder connected to one of the fourth pressure chambers; and a fifth pressure connection to one of the third pressure chambers and a sixth pressure connection to one of the fourth pressure chambers.

2. The transducer of claim 1, wherein the third pressure chamber of the second section is at the partition wall and the fourth pressure chamber of the first section is at the partition wall.

3. The transducer of claim 1, wherein both of the first and the second pressure connecting means are defined in and pass through and along the intermediate member.

4. The transducer of claim 3, wherein the intermediate member extends through the partition wall and is sealed off there.

5. The transducer of claim 3, wherein the third pressure chamber of the second section is at the partition wall and the fourth pressure chamber of the first section is at the partition wall.

6. The transducer of claim 5, wherein the first hydraulic cylinder connects to the third pressure chamber of the first section and the second hydraulic cylinder connects to the fourth pressure chamber of the second section.

7. The transducer of claim 5, wherein the partition wall is stiff.

8. The transducer of claim 6, wherein the intermediate member has opposite ends, and the first hydraulic cylinder receives one of the ends of the intermediate member in it and the second hydraulic cylinder receives the opposite end of the intermediate member in it.

9. The transducer of claim 8, wherein the intermediate member comprises a rigid piston and the diaphragms are secured to the piston to move with the piston.

10. The transducer of claim 5, wherein each pressure capsule section comprises a respective transducer, and the pressure transducers are constructed and arranged as mirror images of each other around the partition wall.

* * * * *